(12) United States Patent
Andersen et al.

(10) Patent No.: US 9,227,176 B2
(45) Date of Patent: Jan. 5, 2016

(54) AMMONIA OXIDATION CATALYST

(71) Applicant: JOHNSON MATTHEY PUBLIC LIMITED COMPANY, London (GB)

(72) Inventors: Paul Joseph Andersen, Plymouth Meeting, PA (US); Kevin Doura, Audubon, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/091,967

(22) Filed: Nov. 27, 2013

(65) Prior Publication Data

US 2014/0154163 A1    Jun. 5, 2014

Related U.S. Application Data

(60) Provisional application No. 61/731,918, filed on Nov. 30, 2012.

(51) Int. Cl.
*B01D 53/34* (2006.01)
*B01D 53/56* (2006.01)
(Continued)

(52) U.S. Cl.
CPC ............ *B01J 23/6527* (2013.01); *B01D 53/58* (2013.01); *B01D 53/9418* (2013.01); *B01D 53/9436* (2013.01); *B01J 21/063* (2013.01); *B01J 23/22* (2013.01); *B01J 23/30* (2013.01); *B01J 23/40* (2013.01); *B01J 23/42* (2013.01); *B01J 23/44* (2013.01); *B01J 35/0006* (2013.01); *B01J 35/04* (2013.01); *B01J 37/0244* (2013.01); *B01J 37/0248* (2013.01); *F01N 3/20* (2013.01); *B01D 53/9477* (2013.01); *B01D 2251/2062* (2013.01); *B01D 2255/1023* (2013.01); *B01D 2255/2092* (2013.01); *B01D 2255/20707* (2013.01); *B01D 2255/20723* (2013.01); *B01D 2255/20776* (2013.01); *B01D 2255/9022* (2013.01); *B01D 2255/9032* (2013.01)

(58) Field of Classification Search
CPC ............ B01J 21/00; B01J 21/04; B01J 21/06; B01J 21/08; B01J 21/12; B01J 23/40; B01J 23/42; B01J 23/44; B01J 23/56; B01J 23/63
USPC ................. 502/247, 261–263, 302, 326, 327, 502/332–334, 339, 349–351, 354, 355, 439, 502/527.12, 527.13, 527.18, 527.19
See application file for complete search history.

(56) References Cited

U.S. PATENT DOCUMENTS 5,409,681 A    4/1995    Kato
5,679,313 A    10/1997    Nojima
(Continued)

FOREIGN PATENT DOCUMENTS

EP    2179792    4/2010

*Primary Examiner* — Cam N. Nguyen
(74) *Attorney, Agent, or Firm* — Gary D. Mangels

(57) ABSTRACT

Provided is a catalyst article for treating an emission gas comprising (a) a noble metal catalyst layer comprising one or more noble metals disposed on a first refractory metal oxide support; and (b) a vanadium catalyst layer comprising vanadium pre-fixed on a second refractory metal oxide support selected from alumina, titania, zirconia, ceria, silica, and mixtures of these, wherein the first catalyst layer is in physical contact with said second catalyst layer. Also provided is a method for making such a catalyst article, a method for treating gas emissions using such an article, and an emission gas treatment system incorporating such an article.

22 Claims, 4 Drawing Sheets

(51) Int. Cl.
*B01D 53/86* (2006.01)
*C01C 3/00* (2006.01)
*B01J 8/00* (2006.01)
*C01B 21/00* (2006.01)
*B01J 21/00* (2006.01)
*B01J 21/04* (2006.01)
*B01J 23/00* (2006.01)
*B01J 23/02* (2006.01)
*B01J 23/08* (2006.01)
*B01J 23/10* (2006.01)
*B01J 23/20* (2006.01)
*B01J 23/40* (2006.01)
*B01J 23/42* (2006.01)
*B01J 23/44* (2006.01)
*B01J 23/56* (2006.01)
*B01J 23/652* (2006.01)
*B01D 53/58* (2006.01)
*F01N 3/20* (2006.01)
*B01J 37/02* (2006.01)
*B01J 35/00* (2006.01)
*B01J 21/06* (2006.01)
*B01J 23/22* (2006.01)
*B01J 23/30* (2006.01)
*B01J 35/04* (2006.01)
*B01D 53/94* (2006.01)

(56) References Cited

U.S. PATENT DOCUMENTS

| | | |
|---|---|---|
| 7,393,511 B2 | 7/2008 | Tran et al. |
| 7,410,626 B2 | 8/2008 | Tran et al. |
| 8,202,481 B2 | 6/2012 | Nochi et al. |
| 8,293,182 B2 * | 10/2012 | Boorse et al. ............... 422/180 |
| 8,637,426 B2 * | 1/2014 | Hoke et al. ................. 502/339 |
| 2006/0182676 A1 | 8/2006 | Tran |
| 2010/0215557 A1 * | 8/2010 | Liu et al. ................. 423/213.5 |
| 2011/0107752 A1 * | 5/2011 | Galligan et al. ............. 60/299 |
| 2011/0217216 A1 * | 9/2011 | Liu et al. ................. 423/213.5 |
| 2011/0286900 A1 * | 11/2011 | Caudle et al. .............. 502/339 |
| 2014/0161695 A1 * | 6/2014 | Hilgendorff et al. ...... 423/213.5 |

* cited by examiner

AMMONIA OXIDATION CATALYST

BACKGROUND

1. Field of Invention

Provided is an oxidation catalyst for treating combustion exhaust gas, and particularly for reducing ammonia slip associated with a selective catalytic reduction process.

2. Description of Related Art

Combustion of hydrocarbon-based fuel in electrical power stations and in engines produces flue or exhaust gas that contains, in large part, relatively benign nitrogen ($N_2$), water vapor ($H_2O$), and carbon dioxide ($CO_2$). But the flue and exhaust gases also contains, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of flue and exhaust gas released into the atmosphere, it is desirable to eliminate or reduce the amount of the undesirable components, preferably by a process that, in turn, does not generate other noxious or toxic substances.

Typically, flue gases from electrical power stations and exhaust gases lean burn gas engines have a net oxidizing effect due to the high proportion of oxygen that is provided to ensure adequate combustion of the hydrocarbon fuel. In such gases, one of the most burdensome components to remove is $NO_x$, which includes nitric oxide (NO), nitrogen dioxide ($NO_2$), and nitrous oxide ($N_2O$). The reduction of $NO_x$ to $N_2$ is particularly problematic because the exhaust gas contains enough oxygen to favor oxidative reactions instead of reduction. Notwithstanding, $NO_x$ can be reduced by a process commonly known as Selective Catalytic Reduction (SCR). An SCR process involves the conversion of $NO_x$, in the presence of a catalyst and with the aid of a nitrogenous reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the NO reduction reaction takes place as the gases pass through or over the catalyzed substrate. The chemical equation for stoichiometric SCR reactions using ammonia is:

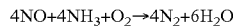
$$4NO+4NH_3+O_2 \rightarrow 4N_2+6H_2O$$

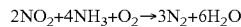
$$2NO_2+4NH_3+O_2 \rightarrow 3N_2+6H_2O$$

$$NO+NO_2+2NH_3 \rightarrow 2N_2+3H_2O$$

Most SCR processes utilize a stoichiometric excess of ammonia in order to maximize the conversion of NOx. Unreacted ammonia that passes through the SCR process (also referred to as "ammonia slip") is undesirable, because the released ammonia gas can negatively impact the atmosphere and can react with other combustion species. To reduce ammonia slip, SCR systems can include an ammonia oxidation catalyst (AMOX) (also known as an ammonia slip catalyst (ASC)) downstream of the SCR catalyst.

Catalysts for oxidizing excess ammonia in an exhaust gas are known. For example, U.S. Pat. No. 7,393,511 describes an ammonia oxidation catalyst containing a precious metal, such as platinum, palladium, rhodium, or gold on a support of titania alumina, silica, zirconia, etc. Other ammonia oxidation catalyst contain a first layer of vanadium oxide, tungsten oxide, and molybdenum oxide on a titania support, and a second layer of platinum on a titania support (see, e.g., U.S. Pat. No. 8,202,481 and U.S. Pat. No. 7,410,626). However, these catalysts are not highly efficient at converting ammonia, particularly at relatively low temperatures. Accordingly, there remains a need in the art for improved ammonia slip catalysts. The present invention satisfies this need among others.

SUMMARY OF THE INVENTION

The present invention, in part, pertains to a dual layer oxidation catalyst that is particularly effective at reducing ammonia slip when used downstream of an SCR process. The dual layer catalyst of the present invention comprises a layer containing vanadium prefixed to a refractory metal oxide-based support and a layer comprising a precious metal. Applicants have surprisingly found that prefixing the vanadium-based component of the catalyst before combining the layers significantly improves the material's low-temperature catalytic activity, particularly with respect to oxidizing ammonia. The novel catalyst of the present invention is capable of improving low temperature ammonia conversion by 200-300 percent compared to conventional dual layer catalysts.

Accordingly, provided is a catalyst article for treating an emission gas comprising (a) a noble metal catalyst layer comprising one or more noble metals disposed on a first refractory metal oxide support; and (b) a vanadium catalyst layer comprising vanadium pre-fixed on a second refractory metal oxide support selected from alumina, titania, zirconia, ceria, silica, and mixtures of these, wherein the noble metal catalyst layer is in physical contact with the vanadium catalyst layer.

According to another aspect of the invention, provided is a method for preparing a catalyst article comprising the steps of (a) loading vanadium onto a refractory metal oxide support; (b) subsequent to step (a), calcining the vanadium loaded refractory metal oxide support to form a prefixed catalyst; (c) coating an inert substrate with supported noble metal catalyst to form a first layer; and (d) coating said inert substrate with said prefixed catalyst to form a second layer.

According to another aspect of the invention, provided is a method for treating an emission gas comprising the steps of (a) contacting a emission gas derived combusting hydrocarbons in a stoichiometric excess of oxygen, wherein the emission gas contains ammonia, with a catalyst article comprising (i) a noble metal catalyst layer comprising one or more noble metals disposed on a first refractory metal oxide support; and (ii) a vanadium catalyst layer comprising vanadium pre-fixed on a second refractory metal oxide support selected from alumina, titania, zirconia, ceria, silica, and mixtures of these, wherein the noble metal catalyst layer is in physical contact with said vanadium catalyst layer; and (b) oxidizing a least a portion of said ammonia to form $N_2$ and/or $NO_x$.

According to yet another aspect of the invention, provided is a system for treating an emission gas comprising an SCR catalyst and an ammonia slip catalyst comprising (i) a noble metal catalyst layer comprising one or more noble metals disposed on a first refractory metal oxide support; and (ii) a vanadium catalyst layer comprising vanadium pre-fixed on a second refractory metal oxide support selected from alumina, titania, zirconia, ceria, silica, and mixtures of these, wherein the noble metal catalyst layer is in physical contact with the vanadium catalyst layer.

DETAILED DESCRIPTION OF PREFERRED EMBODIMENTS OF THE INVENTION

Figure 1A:
FIGS. 1A-1E are drawings of catalyst articles according to certain embodiments of the present invention.

In a preferred embodiment, the invention is directed to a catalyst article for improving environmental air quality, particularly for improving flue or other exhaust gas emissions generated by power plants, gas turbine engines, lean burn internal combustion engines, and the like. Emissions are improved, at least in part, by reducing the concentrations of $NH_3$ and/or $NO_x$ over a broad operational temperature range. Useful catalyst articles include those that oxidize ammonia and/or reduce $NO_x$ in an oxidative environment.

In certain preferred embodiments, the catalyst article comprises a second layer comprising supported vanadium and a first layer comprising supported noble metal, wherein the vanadium is prefixed to its support. As used herein the terms "first layer" and "second layer" are used to describe the relative positions of catalyst layers in the catalyst article with respect to the normal direction of exhaust gas flow through, past, and/or over the catalyst article. Under normal exhaust gas flow conditions, exhaust gas contacts the second layer prior to contacting the first layer. In certain embodiments, the exhaust gas penetrates (and hence contacts) the second layer, before contacting the first layer, and subsequently returns through the second layer to exit the catalyst component. In certain embodiments, the first layer is applied to an inert substrate as a bottom layer and the second layer is applied as a top layer over the first layer. In other embodiments, the second layer is a first zone disposed upstream, but in contact with, the first layer which is disposed as a second zone. In still other embodiments, the first layer is a catalytically active substrate that is coated with second layer, wherein the second layer is a surface layer on the substrate or is a layer that partially or wholly penetrates the substrate.

As used herein, the term "pre-fixed" with respect to supported vanadium, means a source of vanadium that is applied to a refractory metal oxide support and subsequently treated with heat prior to receiving, being mixed with, or being applied to a noble metal catalyst. Refractory metal oxide includes both single metal oxides and mixed metal oxides.

In certain embodiments, the form of vanadium is free vanadium, vanadium ion, or an oxide of vanadium or a derivative thereof. Preferably, the form of vanadium is vanadia ($V_2O_5$). In addition to vanadium, the second layer can include other catalytically active metal oxides such as oxides of tungsten and/or oxides of molybdenum, provided that the metal oxide does not include a noble metal. In certain embodiments, an oxide of vanadium is present in a majority amount relative to other catalytically active metal oxides. In certain other embodiments, oxides of vanadium are present in a minority amount relative to other catalytically metal oxides.

The vanadium is disposed on a high-surface area support that is suitable for use in high temperature heterogenic catalyst applications. The support preferably has a pore volume of about 0.1-0.5 g/cc, for example about 0.2-0.4 g/cc. Preferred support materials include refractory metal oxides such as alumina, titania, zirconia, ceria, non-zeolite silica-alumina, and mixtures of these, with supports comprising titania being more preferred. In certain embodiments, the support material for the vanadium component is titania or titania in combination with another component including tungsten (VI) oxide, molybdenum oxide, or silica as a mixture or as a mixed oxide. While both vanadia and the support can both be metal oxides, the two components are structurally distinct from each other in that the support is present as discrete particles and the vanadia is present in a relatively thin layer that adheres to the particles. Thus, the vanadia and titania are not present as a mixed oxide.

The mean particle size, based on the particle count, of the support material is preferably about 0.01-10 µm, for example about 0.5-5 µm, about 0.1-1 µm, or about 5-10 µm, and preferably has a majority of the particle count within one of these ranges. In other embodiments, the high surface area support is an aluminosilicate, silico-aluminophosphate, or aluminophosphate molecular sieve, such as a zeolite, preferably having a framework of BEA, MFI, CHA, AEI, LEV, KFI, MER, RHO, or ERI, or an intergrowth of two or more of these.

For embodiments in which the vanadium-containing layer comprises a vanadium coating, the vanadium can be applied to the refractory metal oxide support by any technique known in the art. In one example, vanadia as a fine powder, and optionally tungsten (VI) oxide, is mixed with a source of titania particles and formed into slurry or suspension. If desirable, the slurry can be milled or ground to achieve a desired particle size distribution. The mixture containing vanadium and titania is then dried and calcined. Drying can be performed by any conventional method including hot air, microwave, freeze drying, or some combination thereof. Examples of hot air drying include batch or continuous oven drying at about 100-200° C. for about 1-3 hours. After the material is dried, it is calcined preferably at a temperature of about 400-650° C. for about 1-10 hours. The resulting dry material is then processed into a form (for example, a powder) that is suitable as a component in a washcoat or in an extrudable mixture.

Upon calcining, the vanadium adheres to the refractory metal oxide in a manner that resists migration away from the refractory metal oxide when exposed to other catalyst layers, such as supported noble metals in high temperature environments (e.g., >400° C.) such as subsequent calcination or treatment of combustion exhaust gas. Thus a prefixed vanadia/refractory metal oxide material is distinguishable from conventional vanadia/refractory metal oxide materials in that the former has undergone a heat treatment process that binds the vanadia and refractory metal oxide together so that the components are less likely to become separated when subsequently contacting other supported catalysts (e.g., an adjacent layer of platinum supported on titania or alumina) at high temperatures (e.g., >400° C.). In certain embodiments, the prefixing step prevents or reduces the migration of vanadium into a catalyst layer containing a noble metal, particularly when exposed to a high temperature environment such as a calcining process or treatment of emission gases. Accordingly, in certain embodiments, the vanadium containing layer is substantially free of noble metals and the noble metal containing layer is substantially free of vanadium. By "substantially free" is it meant that the relevant metal is not present in the layer in an amount that would affect the performance of the catalyst layer. In certain embodiments, a layer that has a first metal and that is "substantially free" of a second metal means that the layer has less than 5 weight percent of the second metal, relative to the first metal, preferably less than 1 weight percent, and even more preferably less than 0.1 weight percent.

The first catalyst layer comprises a noble metal, preferably a noble metal supported by a refractory metal oxide.

Examples of suitable noble metals include ruthenium, rhodium, palladium, silver, osminum, iridium, platinum, and gold, and combinations thereof, with platinum group metals being preferred, particularly platinum, palladium, and combinations thereof. The noble metal is disposed on a high-surface area support that is suitable for use in high temperature heterogenic catalyst applications. The support preferably has a pore volume of about 0.1-0.5 g/cc, for example about 0.2-0.4 g/cc. Preferred support materials include refractory metal oxides such as alumina, titania, zirconia, ceria, non-zeolite silica-alumina, and mixtures of these, with supports comprising titania being more preferred. In certain embodiments, the support material for the noble metal component is alumina, titania, or titania in combination with another component including tungsten (VI) oxide. The noble metal and support structurally distinct from each other in that the support is present as discrete particles and the noble metal is present in a relatively thin layer that adheres to the particles. The mean particle size, based on the particle count, of the support material is preferably about 0.01-10 μm, for example about 0.5-5 μm, about 0.1-1 μm, or about 5-10 μm, and preferably has a majority of the particle count within one of these ranges.

Typical applications using the catalysts layers of the present invention involve heterogeneous catalytic reaction systems (i.e., solid catalyst in contact with a gas reactant). To improve contact surface area, mechanical stability, and fluid flow characteristics, the catalysts can be disposed on and/or within a substrate. In certain embodiments, a washcoat containing the prefixed vanadium is applied to an inert substrate, such as corrugated metal plate or a honeycomb cordierite brick. Alternatively, the prefixed vanadium is kneaded along with other components such as fillers, binders, and reinforcing agents, into an extrudable paste which is then extruded through a die to form a honeycomb brick. In certain embodiments, the prefixed vanadium layer is not a coating and in certain other embodiments the prefixed vanadium layer is not an extruded substrate.

A washcoat comprising the vanadium component or the noble metal component is preferably a solution, suspension, or slurry. Suitable coatings include surface coatings, coating that penetrate a portion of the substrate, coatings that permeate the substrate, or some combination thereof. Prefixed vanadium coatings preferably contain vanadia in an amount of about 0.1-10 weight percent based on the weight of the refractory metal oxide support, more preferably about 0.5-5 weight percent. Noble metal coating preferably contain about 0.05-0.50 weight percent noble metal based on the weight of the refractory metal oxide support. A washcoat can also include non-catalytic components, such as fillers, binders, stabilizers, rheology modifiers, and other additives, including one or more of alumina, silica, non-zeolite silica alumina, titania, zirconia, ceria. In certain embodiments, the catalyst composition may comprise pore-forming agents such as graphite, cellulose, starch, polyacrylate, and polyethylene, and the like. These additional components do not necessarily catalyze the desired reaction, but instead improve the catalytic material's effectiveness, for example by increasing its operating temperature range, increasing contact surface area of the catalyst, increasing adherence of the catalyst to a substrate, etc. Typically, metal oxide particles used as binders are distinguishable over metal oxide particles used as supports based on particle size, with the binder particles being significantly larger relative to support particles. The first coating layer is preferably applied to the substrate in an amount sufficient to produce a washcoat loading of about 10-300 g/ft$^3$ of noble metal, more preferably about 20-150 g/ft$^3$, and even more preferably about 50-100 g/ft$^3$. The second layer coating is preferably applied to the substrate in an amount sufficient to produce a washcoat loading >0.25 g/in$^3$, such as >0.50 g/in$^3$, or >0.80 g/in$^3$, e.g. 0.80 to 3.00 g/in$^3$. In preferred embodiments, the washcoat loading is >1.00 g/in$^3$, such as >1.2 g/in$^3$, >1.5 g/in$^3$, >1.7 g/in$^3$ or >2.00 g/in$^3$ or for example 1.5 to 2.5 g/in$^3$. Preferably, the first layer is applied to the substrate as an undercoating and the second layer is applied on top of the first layer as a topcoat.

The two most common substrate designs are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow though monolith preferably has a high cell density, for example about 600 to 800 cells per square inch, and/or an average internal wall thickness of about 0.18-0.35 mm, preferably about 0.20-0.25 mm. For certain other applications, the honeycomb flow through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite e.g. acicular mullite, pollucite, a thermet such as Al$_2$OsZFe, Al$_2$O$_3$/Ni or B$_4$CZFe, or composites comprising segments of any two or more thereof. Preferred materials include cordierite, silicon carbide, and alumina titanate.

Plate-type catalysts have lower pressure drops and are less susceptible to plugging and fouling than the honeycomb types, but plate configurations are much larger and more expensive. Honeycomb configurations are smaller than plate types, but have higher pressure drops and plug more easily. In certain embodiments the plate substrate is constructed of metal, preferably corrugated metal.

In another embodiment, the catalyst does not utilize a substrate, but instead provided in bulk or as a packed bed or fluid bed catalyst.

To reduce the amount of space required for an exhaust system, individual exhaust components in certain embodiments are designed to perform more than one function. For example, applying an ASC catalyst to a wall-flow filter substrate instead of a flow-through substrate serves to reduce the overall size of an exhaust treatment system by allowing one substrate to serve two functions, namely reducing ammonia slip by the catalyst and removal of exhaust gas soot by the filter substrate. Accordingly, in certain embodiments, the substrate is a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 µm, for example about 20 to about 30 µm, about 10 to about 25 µm, about 10 to about 20 µm, about 20 to about 25 µm, about 10 to about 15 µm, and about 15 to about 20 µm.

Figure 1B:
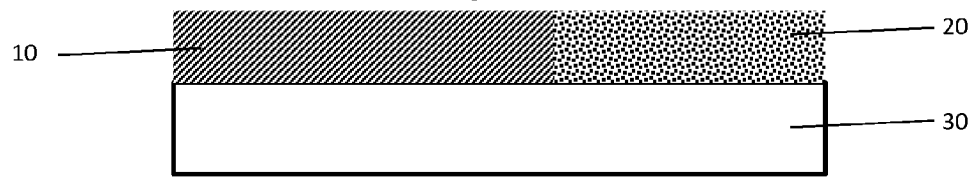
Figure 1C:
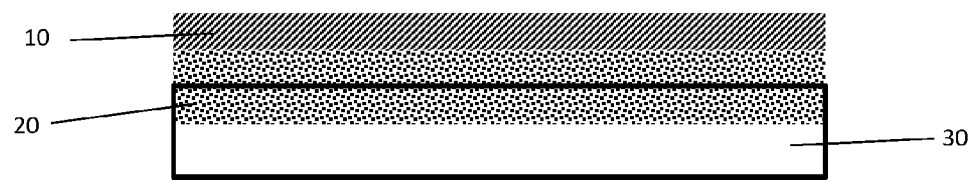
Figure 1D:
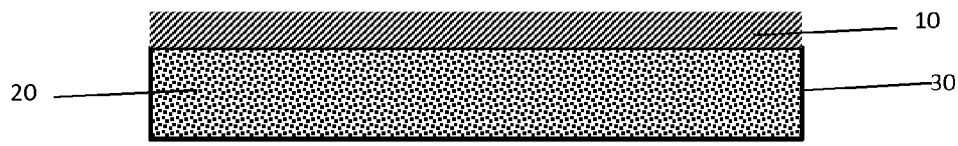

Turning to FIGS. 1A-1D, the first or second layers can be washcoated onto the substrate as continuous layers or in one or more zones corresponding to the axial length of the substrate or the inlet/outlet sides of the substrate filter. Preferably the first and second zones are adjacent to, and in contact with, each other. In FIG. 1A, the first catalyst layer (20) and second catalyst layer (10) are coated on a flow-through substrate (30) along a majority, and preferably the entire, axial length of the substrate. In such embodiments, the two layers are in contact over a majority of their respective lengths, and preferably their entire lengths. In FIG. 1B, the first layer (20) is coated on a downstream portion of the substrate (30) and the second layer (10) is coated on an upstream portion of the substrate (relative to exhaust gas flow), provided that the two layers are in contact with each other, and optionally overlap a portion of their lengths. In certain other embodiments, the first or the second layers is coated on the entire axial length of the substrate, while the other layer is coated on either an upstream portion or a downstream portion of the substrate. For embodiments in which one or both layers are coated on only a portion of the substrate, the portion may be less than 25% of the axial length, less than half of the axial length, more than half of the axial length, or more than 75% of the axial length of the substrate. In FIG. 1C, the first layer (20) penetrates a portion of said substrate (30) and contains a second layer coating (30) over the first layer. In FIG. 1D, the first layer (20) completely permeates the substrate (30), and the second layer (10) is a surface coating on said substrate.

Coating on wall-flow filter are on the inlet and/or outlet side of the filter (relative to exhaust gas flow through the filter), preferably on the outlet side of the filter, particularly for embodiments that also incorporate a selective catalyst reduction (SCR) catalyst or soot oxidation catalyst on the upstream side of the filter.

Figure 1E:
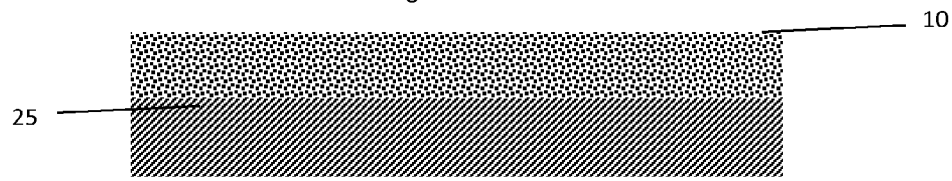

In certain embodiments, the layer containing vanadium is an extruded support. FIG. 1E shows an extruded support (25) and a layer (10) comprising a supported noble metal catalyst. In this embodiment, the layer (10) is a surface coating on said extruded support layer (25). Very generally, the production of an extruded solid body containing the source of vanadium and refractory metal oxide support involves blending the source of vanadium, the refractory metal oxide support, a binder, an optional organic viscosity-enhancing compound into an homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. The calcining step prefixes the vanadium to the refractory metal oxide as described above. Alternatively, a prefixed vanadium/refractory metal oxide support can be added to the paste prior to extrusion.

Extruded solid bodies containing prefixed vanadium according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked e.g. with a suitable ceramic cement, and channels not blocked at the first, upstream end can also be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e. alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof. Alternatively, the silica can be derived from calcining tetramethyl ortho silicate (TMOS) added to the extrusion composition.

Suitable clays include fullers earth, sepiolite, hectorite, a smectite, a kaolin and mixtures of any two or more thereof, wherein the kaolin can be chosen from subbentonite, anauxite, hallo ysite, kaolinite, dickite, nacrite and mixtures of any two of more thereof; the smectite can be selected from the group consisting of montmorillonite, nontronite, vermiculite, saponite and mixtures of any two or more thereof; and the fullers earth can be montmorillonite or palygorskite (attapulgite). Preferably, the vanadium is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

In certain embodiments, the dual layer catalyst article of the present invention is part an emission gas treatment system wherein the dual layer catalyst article is disposed downstream of a source of a nitrogenous reductant. Examples of nitrogenous reductants include ammonia and ammonia hydrazine or any suitable ammonia precursor, such as urea ($(NH_2)_2CO$), ammonium carbonate, ammonium carbamate, ammonium hydrogen carbonate or ammonium formate. More preferably, the catalyst article is disposed downstream of a selective catalytic reduction (SCR) catalyst that the catalyst article can oxidize at least a portion of any nitrogenous reductant that is not consumed by the selective catalytic reduction process. For example, in certain embodiments, the dual layer catalyst of the present invention is disposed on the outlet side of a wall flow filter and an SCR catalyst can be disposed on the upstream side of a filter. In certain other embodiments, the dual layer catalyst is disposed on the downstream end of a flow-through substrate and an SCR catalyst is disposed on the upstream end of the flow-through substrate. In other embodiments, the dual layer catalyst and SCR catalyst are disposed on separate bricks within the exhaust system. These separate bricks can be adjacent to, and in contact with, each other or separated by a specific distance, provided that they are in fluid communication with each other.

Suitable SCR catalyst for the present invention include metal promoted molecular sieves, such as aluminosilicate, silico-aluminophosphate, or aluminophosphate molecular sieves, preferably having a framework of BEA, MFI, CHA, AEI, LEV, KFI, MER, RHO, or ERI, or an intergrowth of two or more of these. The molecular sieve preferably is promoted with a metal such as Ce, Cu, Fe, Co, and the like. Other suitable SCR catalyst include vanadia and/or tungsten oxide supported on zeolite, alumina, titania, silica, tungsten oxides, etc. In certain embodiments, the SCR catalyst and the ammonia slip catalyst described herein have different compositions.

In certain embodiments, ammonia is oxidized at a temperature of at least 100° C. In another embodiment, the ammonia is oxidized at a temperature from about 150° C. to 750° C. In a particular embodiment, the temperature range is from 175 to 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C.

According to another aspect of the invention, provided is a method for the reduction of $NO_x$ compounds and/or oxidation of $NH_3$ in a gas, which comprises contacting the gas with a catalyst described herein for a time sufficient to reduce the level of $NO_x$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an AMOX catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

In a further embodiment, an oxidation catalyst for oxidizing nitrogen monoxide in the exhaust gas to nitrogen dioxide can be located upstream of where the nitrogenous reductant is added into the exhaust gas. In one embodiment, the oxidation catalyst is adapted to yield a gas stream entering the SCR catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the dual layer catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is uncatalyzed, the means for metering nitrogenous reductant can be located between the oxidation catalyst and the filter.

EXAMPLES

Example 1

Catalyst Preparation

A first catalyst layer was prepared as follows: Deionized water and alumina washcoat having a $d_{50}$ of about 3.4-4.2 μm were mixed in a container using a high shear mixer. Succinic acid was slowly added to achieve a concentration of about 100 g/ft³ and the admixture was continuously stirred for at least 30 minutes. Palladium nitrate was added and the resulting admixture was stirred for an additional 60 minutes. Natrasol™ was added and the resulting slurry was mixed for 24 hours. The final washcoat was applied to a 200 cpsi cordierite substrate, dried, and then calcined at 500° C.

A second catalyst layer was prepared as follows: A titania source was heated to about 500° C. for about 1 hour and then added to dissolved ammonium metatungstate to incipient impregnate tungsten on the titania. The resulting material was dried to form a powder which was dried and calcined. The calcined $TiO_2/W$ powder was impregnated with diluted vanadia and the resulting material was dried and then calcined at 500° C. The calcined material was added to a washcoat containing Ludox®. The resulting washcoat, which had a V/W ratio of 50:7, was coated on the substrate over the palladium layer, dried, and then calcined at 500° C.

Example 2

$NH_3$ Conversion Performance

The $NH_3$ conversion performance of a catalyst prepared according to Example 1 was compared to a similar catalyst article, but without prefixed vanadia.

The comparative sample was prepared as follows: A first catalyst layer was prepared as follows: Deionized water and alumina washcoat having a $d_{50}$ of about 3.4-4.2 μm were mixed in a container using a high shear mixer. Succinic acid was slowly added to achieve a concentration of about 100 g/ft³ and the admixture was continuously stirred for at least 30 minutes. Palladium nitrate was added and the resulting admixture was stirred for an additional 60 minutes. Natrasol™ was added and the resulting slurry was mixed for 24 hours. The final washcoat was applied to a 200 cpsi cordierite substrate, dried, and then calcined at 500° C.

A second layer was prepared as follows: Deionized water was mixed with titania and Ludox®. The material was aged for at least 24 hours. The material had a $d_{50}$ of <5.0 μm and a $d_{90}$ of <10.0 μm. VANZAN® was added to achieve a suitable washcoat thickness. The resulting washcoat was applied over the palladium layer, dried, and calcined at 500° C. The washcoated substrate was then dip impregnated with a vanadia/tungsten solution, dried, and calcined.

The catalyst component of Example 1 and the comparative catalyst component were then arranged as an ASC in a system having an upstream SCR catalyst. A simulated exhaust gas containing 40 ppm $NH_3$ and 30 ppm $NO_x$, 15% $O_2$, 8% $H_2O$, 3% $CO_2$, 50 ppm C1-propene, and the remainder $N_2$ was passed through the catalyst components at a space velocity of about 20,000 hr$^{-1}$. The steady state catalytic activity of the components were evaluated at temperatures between 200 and 500° C. in increments of 50° C. Outlet products and conversion of reactants were monitored via FTIR.

Figure 2:
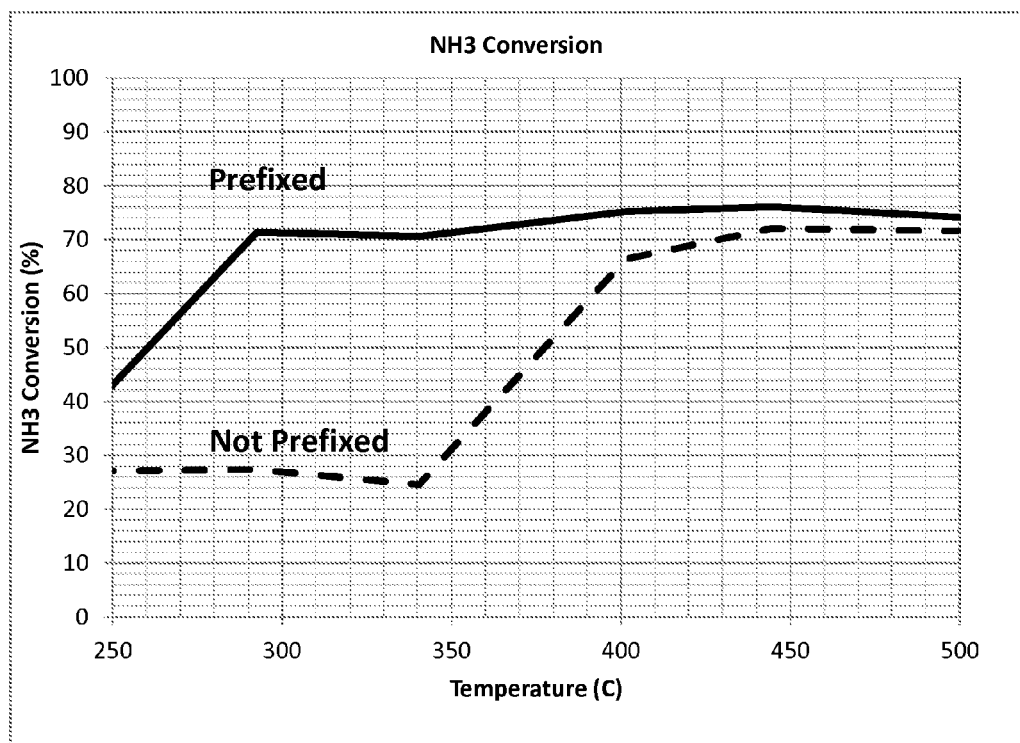
FIG. 2 is a graph depicting $NH_3$ conversion relative to temperature for an embodiment of the present invention.

The results of these tests are provided in FIG. 2. Here, the catalyst containing prefixed vanadia showed a significant increase in NH3 conversion, particularly over a temperature range of about 250° C. to about 400° C., compared to the catalyst that did not have prefixed vanadia.

Example 3

$NO_x$ Selectivity Performance

The $NO_x$ selectivity performance of a catalyst prepared according to Example 1 was compared to a similar catalyst, but without prefixed vanadia under the same test conditions described in Example 2.

Figure 3:
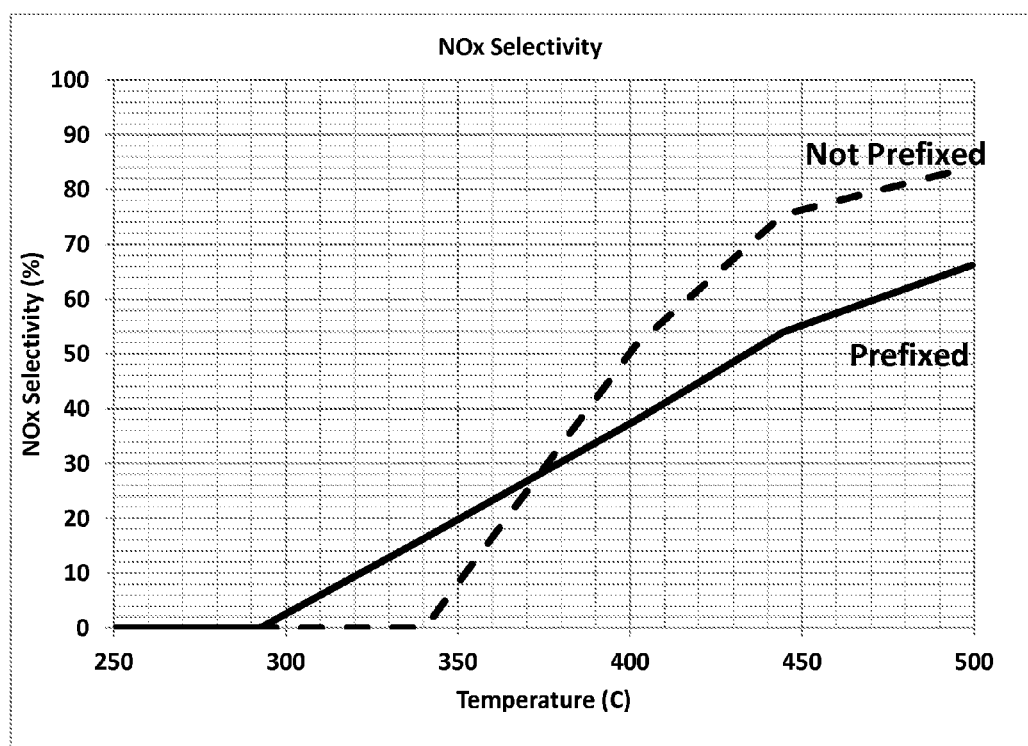
FIG. 3 is a graph depicting $NO_x$ selectivity relative to temperature for an embodiment of the present invention.

The results of these tests are provided in FIG. 3. Here, the catalyst containing prefixed vanadia showed similar $NO_x$ conversion compared to the catalyst that did not have prefixed vanadia.

Example 4

Overall $NH_3$ and $NO_x$ Output

The overall concentration of $NH_3$ and $NO_x$ of a gas passed through a catalyst prepared according to Example 1 was compared to a similar catalyst, but without prefixed vanadia, under the same test conditions described in Example 2.

Figure 4:
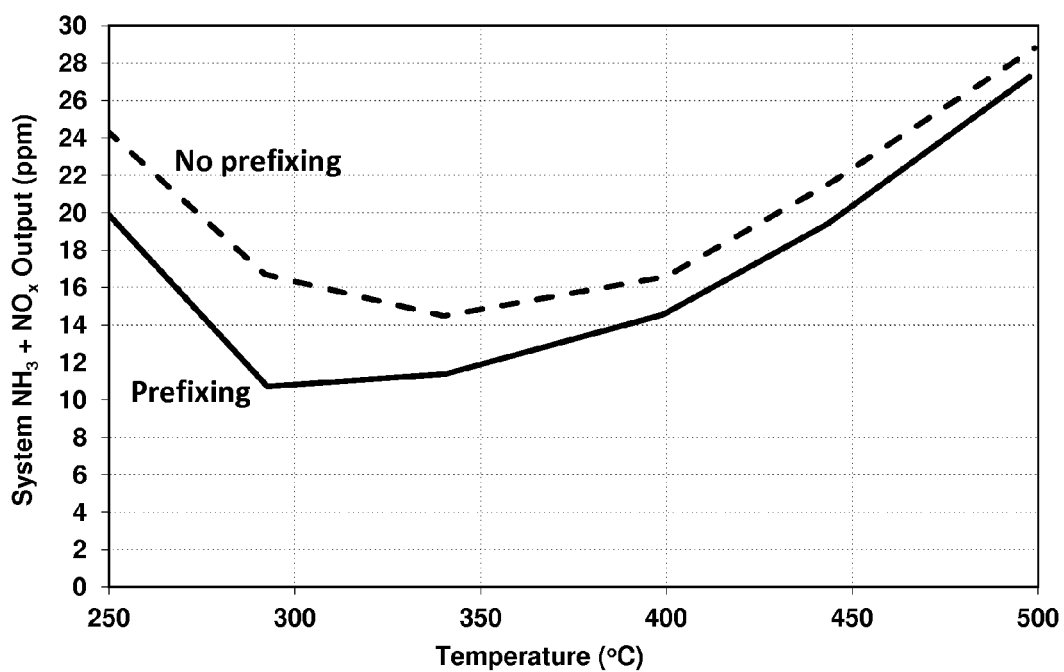
FIG. 4 is a graph depicting overall $NH_3$ and $NO_x$ concentration output for an embodiment of the present invention.

The results of these tests are provided in FIG. 4. Here, the catalyst containing prefixed vanadia showed an overall reduction in $NH_3+NO_x$ concentration exiting the system compared to the catalyst that did not have prefixed vanadia.

What is claimed is:

1. A catalyst article for treating an emission gas comprising:
   a. a noble metal catalyst layer comprising one or more noble metals disposed on a first refractory metal oxide support; and
   b. a vanadium catalyst layer comprising vanadium prefixed on a second refractory metal oxide support selected from the group consisting of alumina, titania, zirconia, ceria, silica, and mixtures thereof,
   wherein the noble metal catalyst layer is in physical contact with the vanadium catalyst layer.

2. The catalyst article of claim 1, wherein said noble metal catalyst layer is a coating applied to an inert substrate selected from the group consisting of honeycomb flow-through monoliths, honeycomb wall-flow monoliths, and corrugated metal plates, and wherein said vanadium catalyst layer is a coating applied to said inert substrate.

3. The catalyst article of claim 2, Wherein said noble metal catalyst layer is a first layer and said vanadium catalyst layer is a second layer.

4. The catalytic article of claim 3, wherein said first layer is substantially free of vanadium and said second layer is substantially free of noble metals.

5. The catalytic article of claim 4, wherein said article is calcined.

6. The catalyst article of claim 4, wherein said second layer comprises vanadia pre-fixed to a titania support, wherein said vanadia is present in an amount of about 0.1-10 weight percent based on the weight of the titania.

7. The catalyst article of claim 6, wherein said second layer further comprises an oxide of tungsten.

8. The catalyst article of claim 6, wherein said first layer comprises at least one of platinum and palladium on an alumina support, wherein said platinum group metal is present in an amount of about 0.05-0.50 weight percent based on the weight of the alumina support.

9. The catalyst article of claim 3, wherein said second layer is applied over at least a portion of said first layer.

10. The catalyst article of claim 3, wherein said inert substrate is a flow-through honeycomb brick.

11. The catalyst article of claim 10, further comprising a selective catalytic reduction (SCR) catalyst disposed on or in said flow-through brick upstream of said first and second layers.

12. The catalyst article of claim 3, wherein said inert substrate is a corrugated metal plate.

13. The catalyst article of claim 3, wherein said inert substrate is a wall flow honeycomb filter.

14. The catalyst article of claim 1, wherein said second catalyst layer is an extruded substrate and said first catalyst layer is a coating on said extruded substrate.

15. The catalyst article of claim 1, wherein the catalyst article provides an increase in the amount of $NH_3$ conversion over a temperature range of about 250° C. to about 400° C., compared to a comparable article having vanadia that was not prefixed.

16. A method for treating an emission gas comprising:
   a. contacting a emission gas derived combusting hydrocarbons in a stoichiometric excess of oxygen, wherein the emission gas contains ammonia, with a catalyst article according to claim 1; and
   b. oxidizing a least a portion of said ammonia to form $N_2$ and/or $NO_x$.

17. The method of claim 16, further comprising providing a process for the upstream selective catalytic reduction of $NO_x$.

18. A system for treating an emission gas comprising an SCR catalyst and an ammonia slip catalyst according to claim 1.

19. A method for preparing a catalyst article comprising:
   a. loading vanadium onto a refractory metal oxide support selected from the group consisting of alumina, titania, zirconia, ceria, silica, and mixtures thereof;
   b. subsequent to step (a), calcining the vanadium loaded refractory metal oxide support to form a prefixed catalyst;
   c. coating an inert substrate with supported noble metal catalyst to form a first layer; and
   d. coating said inert substrate with said prefixed alyst to form a second layer.

20. The method of claim 19, wherein said inert substrate containing said first layer and said second layer is calcined at a temperature of about 400-600° C. for about 1-10 hours.

21. The method of claim 20, wherein said first layer is substantially free of vanadium and said second layer is substantially free of noble metals.

22. The method of claim 19, wherein said first layer comprises vanadia on a titania support and said second layer comprises at least one noble mctal selected from platinum and palladium supported on alumina.

* * * * *